(12) United States Patent
Tak

(10) Patent No.: US 7,593,002 B2
(45) Date of Patent: Sep. 22, 2009

(54) POSITIONING A FRONT PANEL OF A TELEMATICS TERMINAL

(75) Inventor: Jin-Hee Tak, Seoul (KR)

(73) Assignee: LG Electronics Inc., Seoul (KR)

( * ) Notice: Subject to any disclaimer, the term of this patent is extended or adjusted under 35 U.S.C. 154(b) by 646 days.

(21) Appl. No.: 11/365,924

(22) Filed: Mar. 2, 2006

(65) Prior Publication Data

US 2006/0209261 A1    Sep. 21, 2006

(30) Foreign Application Priority Data

Mar. 5, 2005    (KR) .................... 10-2005-0018446

(51) Int. Cl.
*H05K 5/00*    (2006.01)
(52) U.S. Cl. .................. 345/168; 345/905; 348/836; 348/837; 312/7.2; 312/319.5
(58) Field of Classification Search .................. 345/168
See application file for complete search history.

(56) References Cited

U.S. PATENT DOCUMENTS

| | | | | |
|---|---|---|---|---|
| 4,995,680 A | * | 2/1991 | Miruri ........................ 312/7.1 |
| 5,239,700 A | * | 8/1993 | Guenther et al. ......... 455/158.4 |
| 5,362,144 A | * | 11/1994 | Shioya et al. ............ 312/319.6 |
| D391,251 S | * | 2/1998 | Yuyama et al. ............ D14/132 |
| 5,794,164 A | * | 8/1998 | Beckert et al. ............. 455/3.06 |
| 5,917,435 A | * | 6/1999 | Kamiya et al. ......... 340/995.26 |
| 6,364,390 B1 | * | 4/2002 | Finneman .................. 296/37.7 |
| 6,678,166 B1 | * | 1/2004 | Gupta et al. ................. 361/759 |
| 6,816,177 B2 | * | 11/2004 | Wang et al. ................. 345/156 |
| 7,127,728 B2 | * | 10/2006 | Kim et al. .................... 720/655 |
| 2002/0101117 A1 | * | 8/2002 | Shibuya ...................... 307/9.1 |
| 2003/0142064 A1 | * | 7/2003 | Wang et al. ................. 345/156 |
| 2003/0208314 A1 | * | 11/2003 | Funk et al. .................. 701/207 |

* cited by examiner

*Primary Examiner*—Richard Hjerpe
*Assistant Examiner*—Dorothy Webb
(74) *Attorney, Agent, or Firm*—Fish & Richardson P.C.

(57) ABSTRACT

Positioning a front panel of a telematics terminal includes receiving an electronic signal that indicates a change in a physical position of a display panel of the telematics terminal. The front panel, which is distinct from the display panel of the telematics terminal but located on a same side of the telematics terminal as the display panel, is moved from a first position to a second position based on the control signal. The second position is physically displaced from the first position.

35 Claims, 5 Drawing Sheets

POSITIONING A FRONT PANEL OF A TELEMATICS TERMINAL

BACKGROUND

1. Field

This document relates to positioning a front panel of a telematics terminal.

2. Description of the Related Art

A telematics terminal is a device that is typically mounted on a car (mobile vehicle) and connected to a wireless communication network. Telematics terminals are able to perform a variety of functions, including: enabling a user to make calls from the terminal, providing users with map information, performing various multimedia functions, and providing users with navigation information via use of a GPS (Global Positioning System). Telematics terminals often include an audio/video system.

FIG. 1 shows a conventional telematics terminal 100 mounted on a car, and FIG. 2 is a schematic block diagram showing a conventional telematics system. As shown in FIG. 2, a conventional telematics system includes a telematics terminal 100 that communicates with an information providing center 300 over a wireless communication network 200. The information providing center 300 provides telematics service information to the telematics terminal 100. The telematics service information may include call information, map information, traffic information and multimedia information. The telematics terminal 100 provides the received telematics service information to users.

FIGS. 3A and 3B show a conventional telematics terminal 100.

As shown in FIG. 3A, the telematics terminal 100 includes a display panel 101 positioned inside a housing 100H of the telematics terminal 100 and a front panel 102 installed at a lower side of the display panel 101. The front panel 102 includes various buttons and ports.

As shown in FIG. 3B, the display panel 101 of the telematics terminal 100 may be drawn out of the housing 100H of the telematics terminal 100 in response to a user request. The display panel 101 includes a monitor 101A for displaying information. When drawn out of the housing 100H (i.e., when the display panel is deployed), the display panel monitor 101-A is rotated by 90° in an upward direction relative to the telematics terminal.

The front panel 102 of the telematics terminal 100 is fixedly connected to the housing 100H of the telematics terminal. Accordingly, as shown in FIG. 3B, when the display panel 101 is deployed, the various buttons and ports installed in the front panel 102 are obstructed by the display panel 101.

For example, when the display panel 101 of the telematics terminal 100 is deployed by a user, visibility of the sound volume control button, a USB port, or an SD card or the like installed in the front panel 102 of the telematics terminal 100 may be obstructed. Similarly, access to the various buttons and ports on the front panel may be obstructed.

SUMMARY

In one general aspect, positioning a front panel of a telematics terminal includes receiving an electronic signal that indicates a change in a physical position of a display panel of the telematics terminal. The front panel, which is distinct from the display panel of the telematics terminal but located on a same side of the telematics terminal as the display panel, is moved from a first position to a second position based on the control signal. The second position is physically displaced from the first position.

In another general aspect, a telematics terminal includes a housing, a display panel, and a front panel. The display panel includes a monitor configured to display image information. The display panel is configured to move from a first display panel position located inside of the housing to a second display panel position located outside of the housing. Additionally or alternatively, the display panel is configured to move from the second display panel position located outside of the housing to the first display panel position located inside of the housing. The front panel is positioned adjacent to the display panel and is configured to move in response to movement of the display panel.

In another general aspect, an apparatus for controlling a front panel of a telematics terminal includes a rack gear, a pinion gear, a driving unit, and a transfer unit extending from the rack gear. The pinion gear is configured to engage the rack gear, and the driving unit is configured to rotate the pinion gear based on a control signal that indicates movement, in a first direction, of a display panel of the telematics terminal. The transfer unit is configured to support the front panel and to move the front panel in the first direction in response to a rotatory force generated by the driving unit.

The foregoing features and aspects, and other features and aspects, will become more apparent from the following detailed description and drawings.

DETAILED DESCRIPTION

A telematics terminal is configured to enable a user to easily view and access the various buttons and ports installed at the front panel of the telematics terminal, even when the display panel of the terminal is deployed (i.e., moved from an initial position within a housing of the terminal to a final position outside of the housing). The telematics terminal includes a positioning apparatus that is configured to move the front panel forward and away from the housing of the telematics terminal based on or in response to a signal indicating that the display panel has been deployed. The forward movement of the front panel decreases or eliminates the obstruction of the front panel that typically hinders use of the front panel by a user and that is caused by the deployed display panel.

Figure 1:
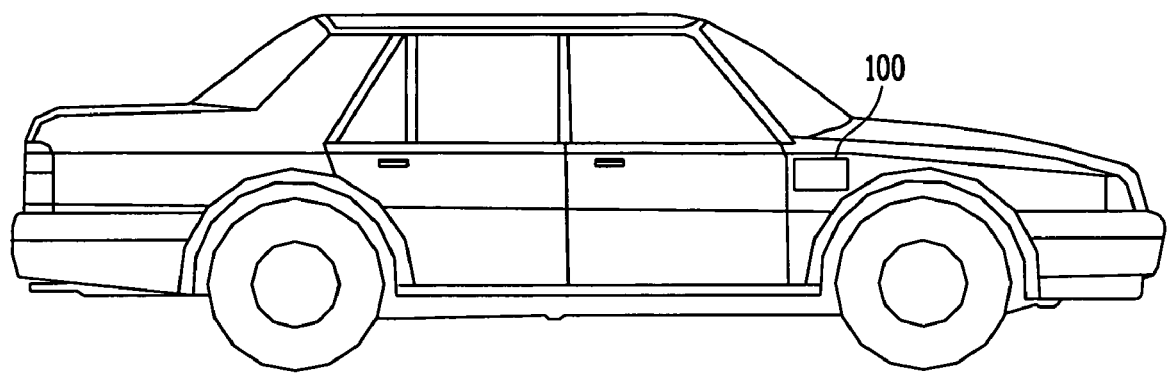
FIG. 1 shows a general telematics terminal mounted on a car.
Figure 2:
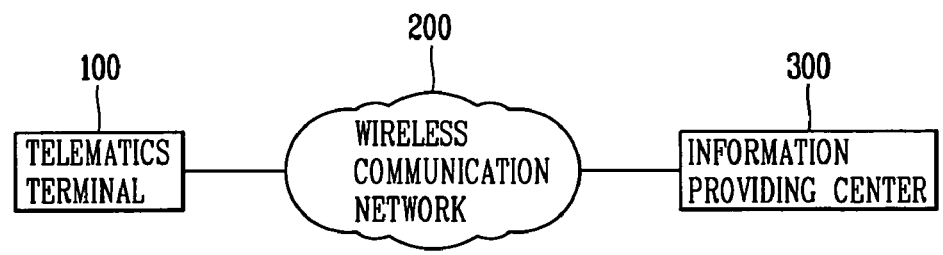
FIG. 2 is a block diagram of a conventional telematics system.
Figure 3A:
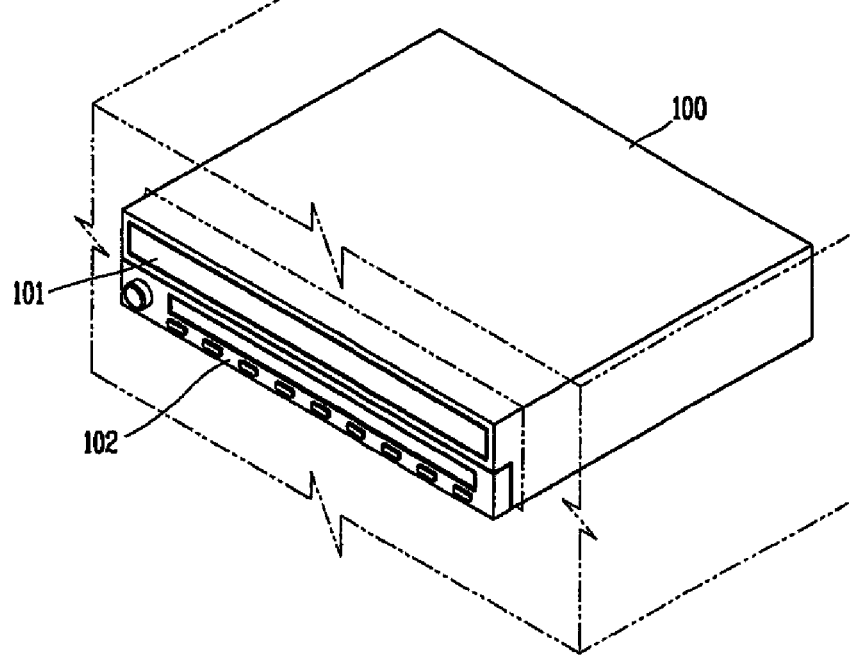
FIGS. 3A and 3B show a conventional telematics terminal.
Figure 3B:
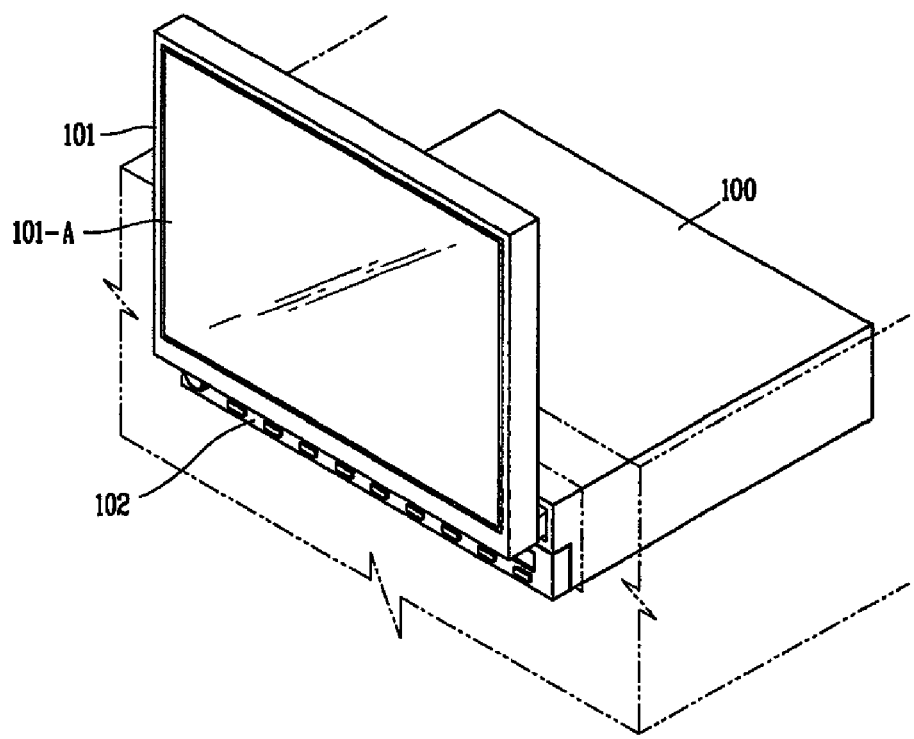
Figure 4:
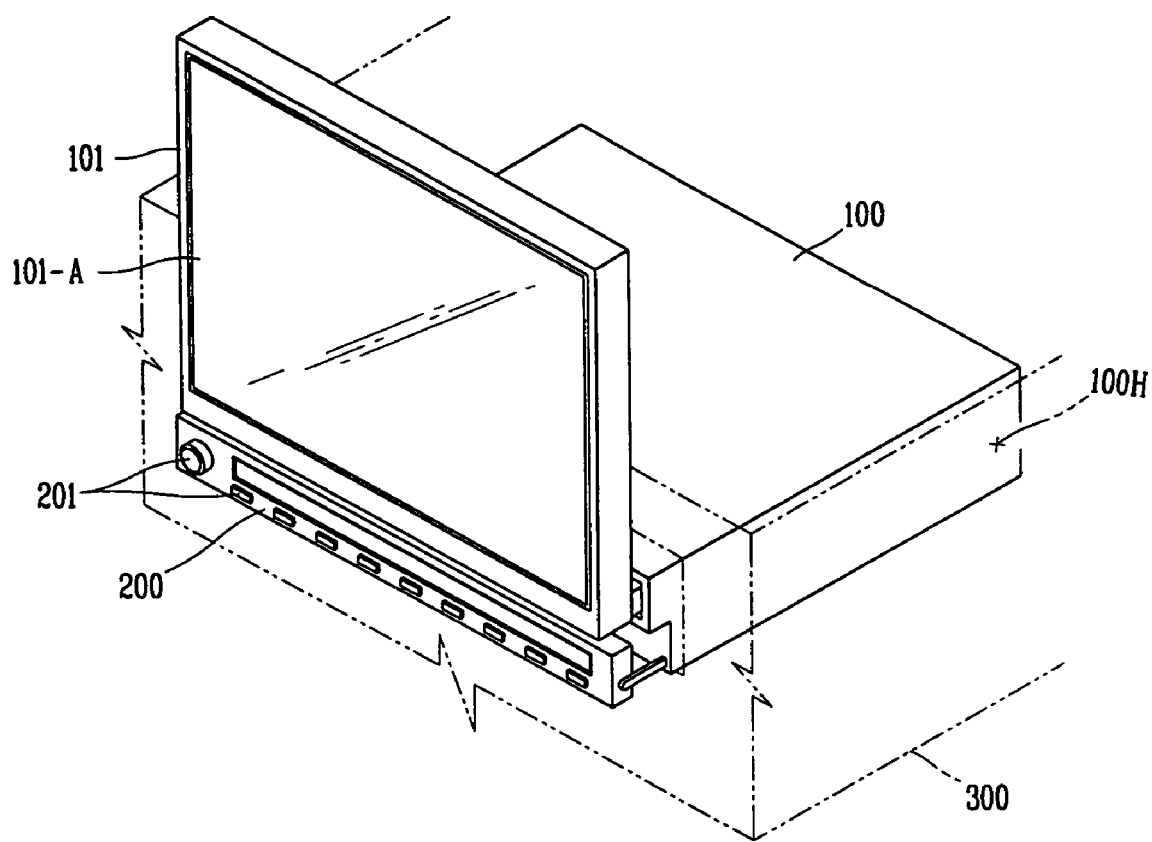
FIG. 4 is a perspective view showing a telematics terminal employing a front panel positioning apparatus.

FIG. 4 is a perspective view showing a telematics terminal employing a front panel positioning apparatus. The telematics terminal 100 is configured to be installed on a dash board 300 inside a car.

As shown in FIG. 4, the telematics terminal 100 includes a display panel 101 having a monitor 101-A (e.g., a liquid crystal display (LCD)) for displaying image information corresponding to an image signal. The image signal may be generated internally by the telematics terminal 100 or received from an external source. The telematics terminal 100 also includes a front panel 200 positioned at a lower side of the display panel 101. FIG. 4 shows the display panel 101 in its deployed position and the front panel 200 moved forward and away from housing 100H. As shown in FIG. 4, when the front panel 200 is moved forward and away from the housing 100H, access to the front panel 200 is less obstructed by the display panel 101.

The front panel 200 includes a plurality of buttons 201 for controlling the telematics terminal 100 and a plurality of ports (not shown) for connected to one or more external devices. The front panel 200 may additionally include various function buttons (e.g., a sound volume control and music selection buttons, etc.).

When the display panel 101 is deployed, the front panel 200 is automatically moved forward and away from the housing 100H of the telematics terminal 100 based on a control signal of a remote controller (not shown).

Figure 5:
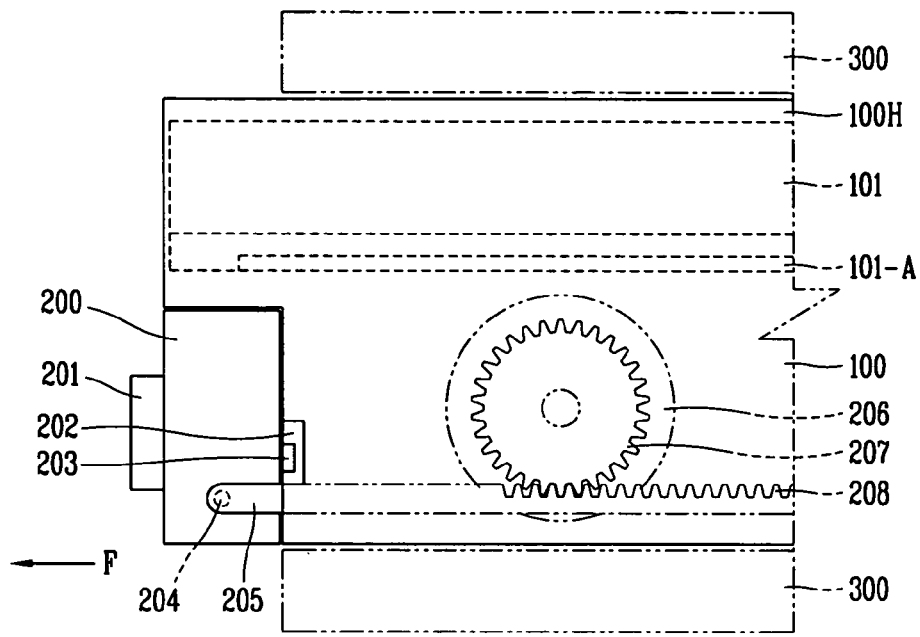
FIG. 5 is a side view of a front portion of the telematics terminal when the display panel is positioned within the housing of the telematics terminal.

FIG. 5 is a side view a front portion of the telematics terminal when the display panel is positioned within the housing of the telematics terminal. As shown in FIG. 5, the front panel positioning apparatus includes a rack gear 208 installed at a lower portion inside the housing 100H of the telematics terminal 100; a driving unit 206 for rotating a pinion gear 207 configured to mesh with the rack gear 208 (i.e., the rack gear is configured to engage the pinion gear 207); and a transfer unit 205 extending from the rack gear 208. The transfer unit 205 is configured to support the front panel 200 and enable movement of the front panel 200 out of the housing 100H of the telematics terminal 100 in response to a rotatory force of the driving unit 206. The front panel 200 and the transfer unit 205 are connected together by a hinge 204.

Figure 6:
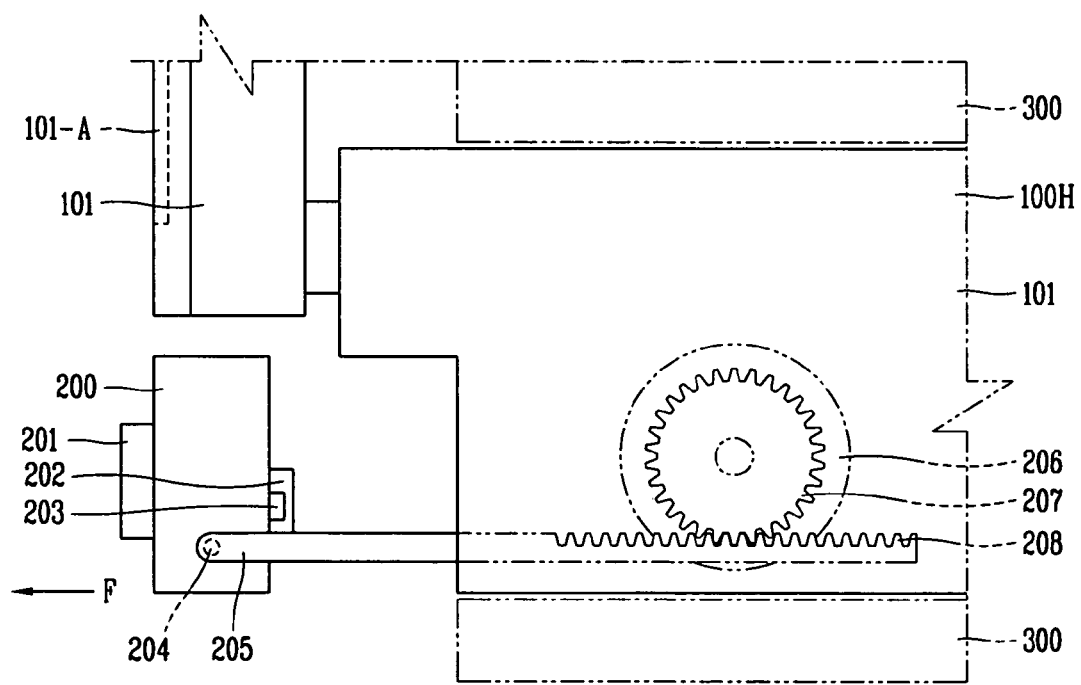
FIG. 6 is a side view of a front portion of the telematics terminal when the display panel is positioned outside of the housing of the telematics terminal.

FIG. 6 is a side view of a front portion of the telematics terminal when the display panel is positioned outside of the housing of the telematics terminal. The operation of the front panel positioning apparatus is described below with reference to FIGS. 5 and 6.

First, a controller (not shown) of the telematics terminal 100 generates a control signal for moving the display panel 101 out of the housing 100H of the telematics terminal 100 according to a user request. The control signal is applied to a motor (not shown) to deploy the display panel 101 (i.e., move the display panel out of the housing 100H).

Concurrently or sequentially, the driving unit 206 receives a control signal indicating deployment of the display panel 101. The control signal received by the driving unit 206 may or may not be the same control signal applied to the motor (not shown) used to deploy the display panel 101. Based on or in response to the control signal, the driving unit 206 rotates the pinion gear 207. For example, when the motor (not shown) draws the display panel 101 out of the housing 100H of the telematics terminal 100, the driving unit 206 may rotate the pinion gear 207 in a clockwise direction based on the control signal.

The pinion gear 207 is rotated in response to application of a rotatory force by the driving unit 206. The rack gear in mesh with (i.e., engaging) the pinion gear 207 is moved out of the housing 100H of the telematics terminal 100 in response to the rotatory force of the pinion gear 207. As the rack gear 208 is moved, the transfer unit 205, which extends from the rack gear 208, moves the front panel 200 in a direction F (FIG. 5) away from the housing 100H. In some implementations, the transfer unit 205 may move along a guide rail (not shown).

Accordingly, the front panel 200 is moved away from the housing 100H of the telematics terminal 100 in response to the display panel 101 being moved out of the housing 100H. This moving of the front panel 200 with the display panel 101 results in a decrease or an elimination of any obstruction of the front panel 200 by the deployed display panel 101. A user, therefore, may easily check and use the plurality of buttons and ports on the front panel 200. In some implementations, when the display panel 101 is deployed, the front panel 200 and the monitor 101-A of the display panel 101 are positioned side by side and flush against each other such that their front surfaces are approximately on the same plane.

When the display panel 101 is moved back into the housing 100H of the telematics terminal 100, the driving unit 206 applies a rotary force to rotate the pinion gear 207 in a reverse direction (i.e., a counterclockwise direction). The pinion gear 207 moves the rack gear 208 back into the housing 100H of the telematics terminal 100 in response to the reverse rotatory force of the driving unit 206. As the rack gear 208 is moved back into the housing 100H, the transfer unit 205 extending from the rack gear 208 moves the front panel 200 back towards the housing 100H in a direction opposite of the direction F (FIG. 6). In some implementations, the rack gear 208 is replaced by a power transfer unit such as, for example, a belt (not shown) and a pulley (not shown).

Figure 7:
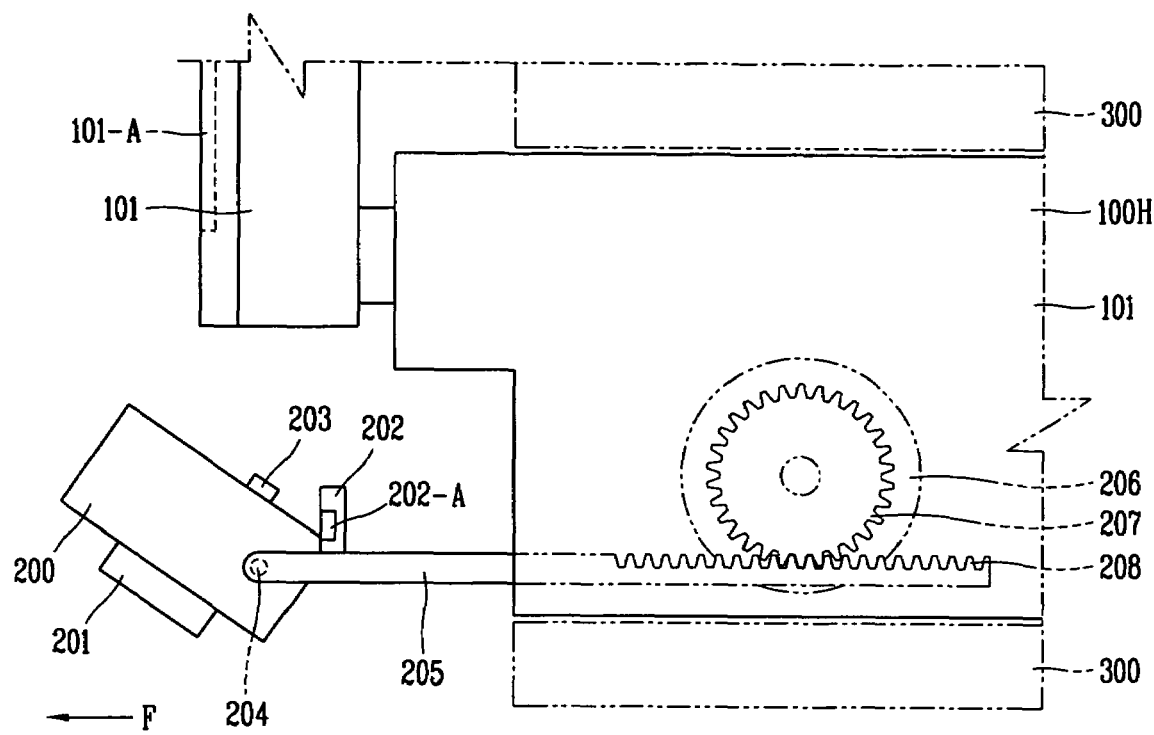
FIG. 7 is a side view of a front portion of the telematics terminal when the display panel is positioned outside of the housing of the telematics terminal.

The front panel 200 of the telematics terminal 100 is coupled to transfer unit 205 by a hinge 204. The front panel 200 may rotate about the hinge 204 such that it may be pulled or pivoted in a forward direction. FIG. 7 shows a side view of a front portion of the telematics terminal when the display panel is positioned outside of the housing 100H of the telematics terminal and the front panel has been pivoted about hinge 204. The pivoting or pulling forward of the front panel 200 enables devices, such as, for example, an optical disk, to be inserted into or drawn out of the telematics terminal 100. The user, for example, can pull the front panel 200 in the forward direction such that it pivots about hinge 204 to insert an optical disk into a slot (not shown) positioned behind the front panel 200 in the telematics terminal 100. Similarly, the user may pull the front panel 200 in the forward direction such that it pivots about hinge 204 to remove an optical disk from the slot.

The front panel 200 includes a fixed protrusion 203 that protrudes from a back surface of the front panel 200. This fixed protrusion 203 engages or fits within a recess 202-A defined by a fixed member 200 connected to the transfer unit 205. When the user pulls the front panel 200 in the forward (F) direction by means of the hinge 204, the front panel 200 is prevented from rotating freely by the fixed member 202.

The front panel 200 of the telematics terminal 100 may be selectively attached to and detached from the transfer unit 205 in order to expose, for example, the slot. To enable selective attachment and detachment of the front panel 200, the front panel 200 may include a fixed protrusion located on its back surface that detachably engages a recess defined by transfer unit 205. The recess defined by transfer unit 205 may be located on the surface of transfer unit 205 that contacts the surface of the front panel 200. Additionally or alternatively, the transfer unit 205 may include a fixed protrusion that detachably engages a recess defined by the front panel 200 and located on the back surface of the front panel 200.

The above-described apparatus and method for positioning a front panel based on or in response to movement of a display panel may be used not only in telematics terminals but also in other systems that suffer from similar panel obstruction problems caused by deployment of a second panel or monitor. For example, the same method and apparatus may be applied to various audio/video systems having a monitor that, when deployed, obstructs access to a control panel.

Other implementations are within the scope of the following claims

What is claimed is:

1. A method for positioning a front panel of a telematics terminal, the method comprising:
receiving a control signal indicating a change in a physical position of a display panel of the telematics terminal; and
moving a front panel of the telematics terminal based on the control signal, which is distinct from the display panel of the telematics terminal but located on a same side of the telematics terminal as the display panel, from a first position to a second position, the second position being physically displaced from the first position.

2. The method of claim 1, wherein the display panel comprises a monitor.

3. The method of claim 1, wherein moving the front panel comprises moving the front panel concurrently and in a same direction as a direction of movement of the display panel of the telematics terminal when the physical position of the display panel is changed.

4. The method of claim 1, wherein the front panel comprises a plurality of buttons and a plurality of ports.

5. The method of claim 1, wherein the front panel is positioned adjacent to the display panel.

6. The method of claim 1, wherein moving the front panel based on the control signal comprises moving the front panel in response to the control signal.

7. An apparatus for positioning a front panel of a telematics terminal, the apparatus comprising:
a transferring module configured to:
receive an electronic signal indicating a change in a physical position of a display panel of the telematics terminal; and
move a front panel of the telematics terminal based on the control signal, which is distinct from the display panel of the telematics terminal but located on a same side of the telematics terminal as the display panel, from a first position to a second position, the second position being physically displaced from the first position.

8. The apparatus of claim 7, wherein the transferring module comprises:
a rack gear;
a driving unit for rotating a pinion gear in mesh with the rack gear based on the control signal; and
a transfer unit extending from the rack gear, the transfer unit being configured to support the front panel and to enable movement of the front panel in response to a rotatory force of the driving unit.

9. The apparatus of claim 8, wherein when the change in the physical position of the display panel results from movement of the display panel out of a housing of the telematics terminal, the driving unit is configured to move the front panel of the telematics terminal from a position adjacent to the housing of the telematics terminal to a position away from the housing of the telematics terminal.

10. The apparatus of claim 8, wherein when the change in the physical position of the display panel results from movement of the display panel into a housing of the telematics terminal, the driving unit is configured to move the front panel of the telematics terminal from a position away from the housing of the telematics terminal to a position adjacent to the housing of the telematics terminal.

11. The apparatus of claim 8, further comprising a fixed member connected to the transfer unit and defining a recess configured to receive a fixed protrusion that protrudes from a rear surface of the front panel.

12. The apparatus of claim 8, wherein the transfer unit defines a recess configured to receive a fixed protrusion that protrudes from a surface of the front panel.

13. The apparatus of claim 8, wherein the transfer unit includes a fixed protrusion that protrudes from a surface of the transfer unit and that is configured to be received in a recess defined by the front panel.

14. The apparatus of claim 7, wherein the display panel comprises a monitor.

15. The apparatus of claim 7, wherein the transferring module is configured to move the front panel concurrently and in a same direction as a direction of movement of the display panel of the telematics terminal when the physical position of the display panel is changed.

16. The apparatus of claim 7, wherein the front panel comprises a plurality of buttons and a plurality of ports.

17. The apparatus of claim 7, wherein the front panel is positioned adjacent to the display panel.

18. The method of claim 7, wherein the transferring module is configured to move the front panel in response to the control signal.

19. A telematics terminal comprising:
a housing;
a display panel including a monitor configured to display image information, the display panel being configured to: move from a first display panel position located inside of the housing to a second display panel position located outside of the housing, and move from the second display panel position located outside of the housing to the first display panel position located inside of the housing;
a front panel positioned adjacent to the display panel; and
a controller configured to move the front panel based on a control signal for moving the display panel.

20. The terminal of claim 19, wherein the front panel comprises a plurality of buttons for controlling the telematics terminal and a plurality of ports for enabling the telematics terminal to communicate with one or more external devices.

21. The terminal of claim 19, wherein the controller is configured to automatically move the front panel based on a control signal of a remote controller indicating a change in position of the display panel from the first display panel position to the second display panel position or from the second display panel position to the first display panel position.

22. The terminal of claim 19, wherein the controller comprises: a rack gear; a driving unit for rotating a pinion gear in mesh with the rack gear based on a control signal indicating a change in a physical position of the display panel; and a transfer unit extending from the rack gear, the transfer unit being configured to support the front panel and to enable movement of the front panel in response to a rotatory force of the driving unit.

23. An apparatus for positioning a front panel of a telematics terminal comprising:
a rack gear;
a pinion gear configured to engage the rack gear;
a driving unit configured to rotate the pinion gear based on a control signal, the control signal indicating movement of a display panel of the telematics terminal in a first direction; and a transfer unit extending from the rack gear, the transfer unit being configured to support the front panel and to move the front panel in the first direction in response to a rotatory force generated by the driving unit.

24. The apparatus of claim 23, wherein the front panel comprises a plurality of buttons and a plurality of ports.

25. The apparatus of claim 23, wherein the front panel is positioned adjacent to the display panel.

26. The apparatus of claim 23, further comprising a fixed member connected to the transfer unit and defining a recess configured to receive a fixed protrusion that protrudes from a rear surface of the front panel.

27. A method for positioning a front panel of a telematics terminal, the method comprising:
   receiving a signal to move a display panel of the telematics terminal; and
   moving a front panel of the telematics terminal based on the signal.

28. The method of claim 27, wherein the front panel is distinct from the display panel.

29. The method of claim 27, wherein the display panel and the front panel are moved together.

30. The method of claim 27, wherein the front panel is located on a same side of the telematics terminal as the display panel.

31. An apparatus for controlling a front panel of a telematics terminal, the apparatus comprising:
   a driving unit for moving a front panel of the telematics terminal based on a signal for moving a display panel of the telematics terminal, wherein the front panel is distinct from the display panel.

32. The apparatus of claim 31, wherein the display panel and the front panel are moved together.

33. The apparatus of claim 31, wherein the front panel is located on a same side of the telematics terminal as the display panel.

34. A telematics terminal comprising:
   a display panel;
   a front panel comprising a plurality of buttons; and
   a transferring module configured to move the display panel based on an electronic signal indicating a change in a physical position of the display panel of the telematics terminal, and move the front panel based on the electronic signal.

35. The apparatus of claim 34, wherein the transferring module is configured to independently move the front panel based on the electronic signal.

* * * * *

UNITED STATES PATENT AND TRADEMARK OFFICE
CERTIFICATE OF CORRECTION

PATENT NO. : 7,593,002 B2
APPLICATION NO. : 11/365924
DATED : September 22, 2009
INVENTOR(S) : Jin-Hee Tak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Twenty-first Day of September, 2010

David J. Kappos
*Director of the United States Patent and Trademark Office*